US012665507B2

(12) United States Patent
Ledvina

(10) Patent No.: US 12,665,507 B2
(45) Date of Patent: Jun. 23, 2026

(54) TRIMMING CIRCUIT FOR BANDGAP REFERENCES

(71) Applicant: SEMICONDUCTOR COMPONENTS INDUSTRIES, LLC, Scottsdale, AZ (US)

(72) Inventor: Jan Ledvina, Tovacov (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 229 days.

(21) Appl. No.: 18/619,969

(22) Filed: Mar. 28, 2024

(65) Prior Publication Data

US 2025/0070664 A1    Feb. 27, 2025

Related U.S. Application Data

(60) Provisional application No. 63/578,867, filed on Aug. 25, 2023.

(51) Int. Cl.
H02M 3/156 (2006.01)

(52) U.S. Cl.
CPC .................................. H02M 3/156 (2013.01)

(58) Field of Classification Search
CPC ........... H02M 3/156; G05F 3/30; G05F 1/561
USPC ....................................................... 323/282
See application file for complete search history.

(56) References Cited

U.S. PATENT DOCUMENTS 6,218,822 B1    4/2001  MacQuigg
6,329,804 B1    12/2001  Mercer

| | | |
|---|---|---|
| 8,947,067 B1 | 2/2015 | Zarei |
| 10,331,151 B1 | 6/2019 | Chu |
| 11,287,840 B2 | 3/2022 | Randlisec |
| 2002/0003447 A1 | 1/2002 | Nagase et al. |
| 2002/0180515 A1* | 12/2002 | Opris ........................ G05F 3/30 |
| | | 327/539 |
| 2012/0169413 A1 | 7/2012 | Choi |
| 2013/0307517 A1 | 11/2013 | Huang et al. |
| 2016/0266598 A1* | 9/2016 | Wong ...................... G05F 3/267 |
| 2016/0334816 A1 | 11/2016 | Ji |
| 2017/0310214 A1* | 10/2017 | Kawano ................ H02M 3/156 |

(Continued)

OTHER PUBLICATIONS

Ge et al., "A Single-Trim CMOS Bandgap Reference With a 3σ Inaccuracy of 0.15% From 40 C to 125 C," IEEE Journal of Solid-State Circuits, vol. 46, No. 11, Nov. 2011, p. 2693-2701.

(Continued)

*Primary Examiner* — Yemane Mehari
(74) *Attorney, Agent, or Firm* — Quinn IP Law

(57) ABSTRACT

An electrical circuit includes positive and negative voltage rails, a reference voltage rail, a non-trimmable bandgap core configured to output a voltage reference on the reference voltage rail, and a trimming element in an auxiliary section located external to the bandgap core. A current source is coupled to the non-trimmable bandgap core and the positive voltage rail. An auxiliary diode arranged in an auxiliary section outside of the bandgap core is coupled to the current source and negative voltage rail. The trimming element is coupled to the current source external to the non-trimmable bandgap core and has an adjustable set point. The adjustable set point is adjusted to inject a corresponding bias current to the auxiliary section during a trimming process and thereby change the voltage reference.

20 Claims, 7 Drawing Sheets

(56) References Cited

U.S. PATENT DOCUMENTS

2019/0334543 A1\*  10/2019  Luo .......................... H03M 1/68
2021/0027128 A1    1/2021  Futterman
2025/0103072 A1\*   3/2025  Sabut ...................... G05F 1/575

OTHER PUBLICATIONS

Hsiao et al., "A 1.5-V 1 0-ppm/° C. 2nd-Order Curvature-Compensated CMOS Bandgap Reference with Trimming," Department of Electrical Engineering and Graduate Institute of Electronics Engineering, National Taiwan University Taipei, Taiwan, 2006, p. 565-568.

\* cited by examiner

TRIMMING CIRCUIT FOR BANDGAP REFERENCES

CROSS-REFERENCE TO RELATED APPLICATIONS

The present application claims the benefit of priority to U.S. Provisional Application No. 63/578,867 filed on Aug. 25, 2023, which is hereby incorporated by reference in its entirety.

TECHNICAL FIELD

The present disclosure generally relates to trimming circuit topologies and related methods for providing high accuracy bandgap references in semiconductor devices.

INTRODUCTION

Modern power electronic devices such as onboard chargers, traction power inverters, analog-to-digital converters, and direct current-to-direct current (DC-DC) voltage converters rely on advanced silicon technologies to meet power and operating efficiency requirements. The precise real-time control of such devices may be achieved using one or more integrated circuits (ICs) in the form of, e.g., microprocessors, memory circuits, sensors, amplifiers, and wireless communication chips. ICs rely on the availability of a substantially temperature invariant reference voltage in order to perform a host of functions.

To that end, bandgap core circuitry is designed into an IC to provide a substantially invariant voltage reference. The voltage reference is based on the energy-band difference or "gap" between a semiconductor's valence and conduction bands. Because of this, the circuitry is sometimes referred to as a bandgap reference circuit, with the output voltage of the bandgap reference circuit referred to as the bandgap voltage. For silicon-based bandgap reference circuits, the bandgap voltage may range between about 1.2 volts to about 1.3 volts in some embodiments.

Despite the bandgap voltage being substantially invariant to temperature fluctuations, the manufacturing processes used to construct the bandgap reference circuit may have variations that can result in a slight chip-to-chip variation in the bandgap voltage across devices manufactured with the same manufacturing process steps. To help correct for such process-induced performance variations, a trimming process is often performed by adjusting ratios of various resistors used to construct the bandgap core, e.g., via digital/bit trimming, laser or ion beam trimming, or switch activation. Trimming within the bandgap core circuitry is thus commonly used to fine tune a voltage reference to a desired value and thereby ensure consistent performance across an intended temperature range.

SUMMARY

Disclosed herein are voltage reference trimming methods that are performed outside of the resident circuitry of a bandgap core, along with corresponding circuit topologies for performing such trimming methods. Among other attendant benefits, performance of the trimming process outside of the bandgap core helps to ensure optimal core accuracy with minimal residual errors, with the latter being more prevalent in integrated circuits displaying higher order curvature in a base-emitter voltage response. The trimming methods described below may be associated with reduced silicon area and required test time relative to trimming processes performed within circuitry of the bandgap core. The present approach is also compatible with a wide variety of bandgap reference circuits, including but not limited to those compensating for higher order base-emitter voltage curvature.

In particular, an electrical circuit is disclosed herein that has a non-trimmable bandgap core, a current source coupled to the bandgap core, and an auxiliary section positioned external to the bandgap core. The auxiliary section includes an auxiliary diode and trimming element coupled to the current source, and a pair of resistors coupled to the bandgap core. A set point of the trimming element is adjusted so as to inject a bias current into the auxiliary section. The voltage reference is adjusted in this manner.

Embodiments described herein control the bias current adjustment by changing a mirror ratio of the above-noted current source, e.g., a pair of field effect transistors such as first and second p-channel metal-oxide-semiconductors. The present teachings are also applicable to electrical circuits having a base-emitter voltage curvature compensation circuit.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

BRIEF DESCRIPTION OF THE DRAWINGS

The drawings described herein are for illustrative purposes only, are schematic in nature, and are intended to be exemplary rather than to limit the scope of the disclosure.

Figure 1:
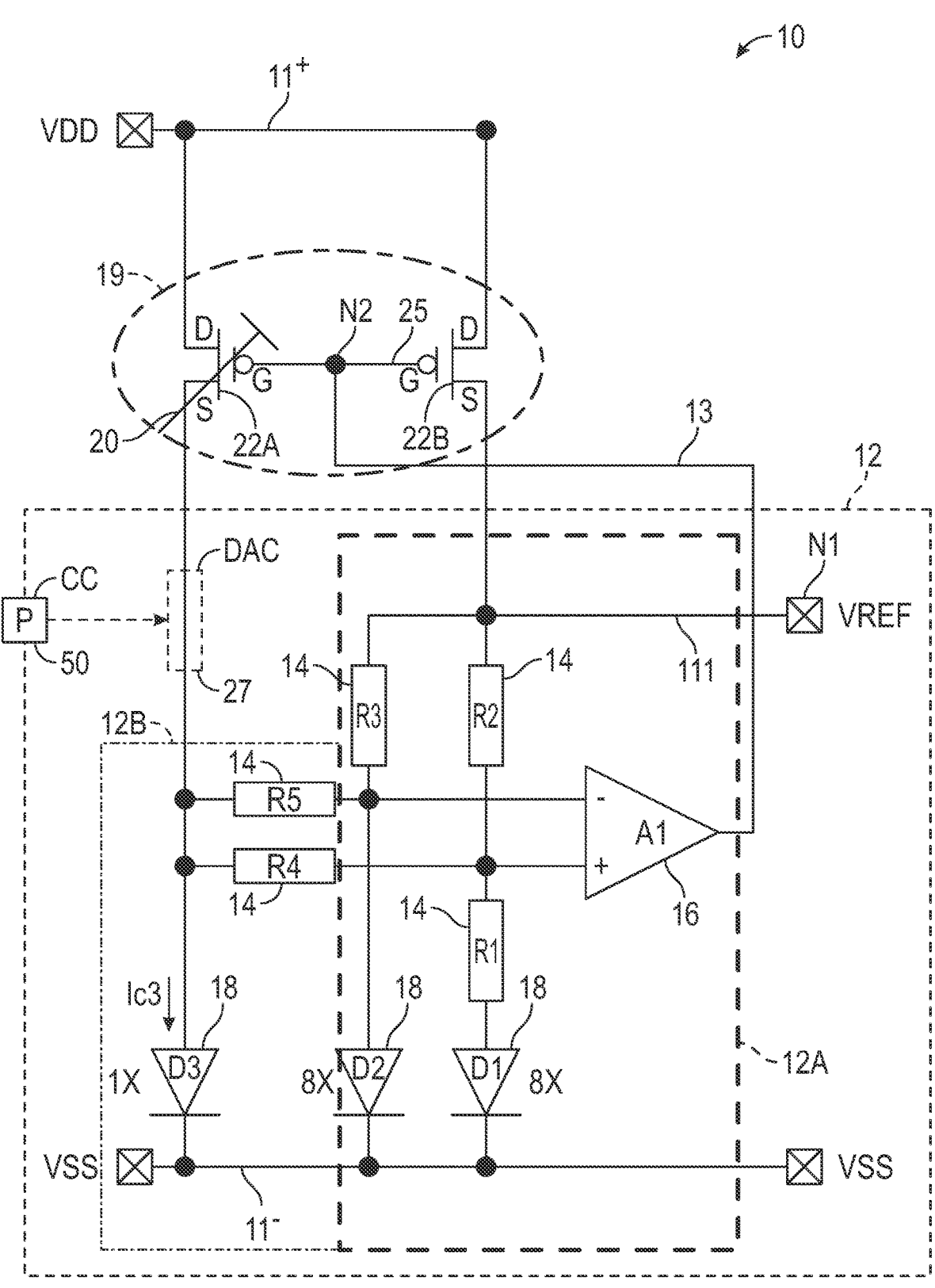
FIG. 1 is a circuit diagram of a representative electrical circuit in accordance with the present disclosure.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

With reference to the drawings, wherein like reference numbers refer to the same or similar components throughout the several views, an electrical circuit 10 is shown in FIG. 1 that is suitable for use as part of an integrated circuit (IC), a system-on-a chip (SoC), or another semiconductor-based electrical device. The electrical circuit 10 includes a positive voltage rail ($V_{DD}$) 11$^+$ and a negative voltage rail ($V_{SS}$) 11$^-$. As appreciated in the art, the positive voltage rail 11$^+$ is connectable to a regulated direct current (DC) power supply (not shown), for instance about 3.3-5.0 volts (V) in a typical embodiment. In contrast, the negative voltage rail 11$^-$ acts as electrical ground in the illustrated electrical circuit 10.

As contemplated herein, the electrical circuit 10 of FIG. 1 includes a bandgap reference circuit 12 having a non-trimmable bandgap core 12A and an auxiliary section 12B. Possible underlying hardware constructions of the bandgap core 12A of FIG. 1 that may be used within the scope of the present disclosure include the Kujik, Brokaw, or Widlar cores, all of which are appreciated in the art, and therefore the bandgap core 12A illustrated in FIG. 1 is non-limiting and illustrative of the present teachings.

The bandgap reference circuit 12 is coupled to the respective positive and negative voltage rails 11$^+$ and 11$^-$, and to a reference voltage rail 111. When the bandgap reference circuit 12 is energized by the above-noted regulated DC power supply, the bandgap reference circuit 12 is configured to output a substantially temperature invariant voltage reference ($V_{REF}$) at a corresponding output node N1, e.g., within about ±5%-10% of a desired value in some embodiments. For example, the bandgap reference circuit 12 may output about 1.2 V-1.3 V in a typical 3.3V-5V supply implementation.

The bandgap reference circuit 12 includes a plurality of resistors 14, which are also individually labeled R1-R5 for clarity, with resistors R1, R2, and R3 residing within the non-trimmable bandgap core 12A. The bandgap reference circuit 12 also includes an operational amplifier (op amp) (A1) 16 and a trio of diodes 18 individually labeled D1-D3. On a given semiconductor wafer, the resistors 14 and the diodes 18 are typically manufactured as close together as possible using a predetermined layout technique. Such compactness eliminates sensitivity to local variations in doping and temperature effects. The diodes 18 (D1-D3) may be replaced in one or more embodiments by bipolar junction transistors (BJTs) connected as diodes, i.e., shorted between base and collector, and therefore the diodes 18 of FIG. 1 are representative and non-limiting.

When constructing the bandgap reference circuit 12, each constituent component is provided with corresponding values to produce the voltage reference ($V_{REF}$). The voltage reference ($V_{REF}$) is then trimmed outside of the bandgap core 12A as set forth herein to account for the above-noted process variation. The voltage reference ($V_{REF}$) values are application specific, as appreciated in the art, as is the gain of the op amp 16. The dominant error component of the voltage reference ($V_{REF}$) is the variation in the base-emitter voltage ($V_{BE}$), with the error having proportional-to-absolute temperature (PTAT) behavior. Consequently, trimming outside of the bandgap core 12A occurs to adjust the PTAT voltage used to generate the voltage reference ($V_{REF}$).

In the representative construction of FIG. 1, the resistors R4 and R5 of the auxiliary section 12B are arranged in parallel on separate first and second input terminals (+, -) to the op amp 16 as shown, i.e., the first and second input terminals (+, -) are connected to corresponding resistors R4 and R5. The output of the op amp 16 is carried on a feedback trace 13. Additionally, a trimming element 20 as used herein is operable to output a component of the above-noted PTAT voltage to the corresponding resistors R4 and R5 to change the voltage reference ($V_{REF}$) during the trimming process. That is, operation of the trimming element 20 changes a current density ratio of the diodes D2 and D3 to perform the described trimming function entirely outside of the non-trimmable bandgap core 12A.

In the exemplary circuit topology of FIG. 1, the resistors R2 and R3 are respectively arranged between the reference voltage rail 111 and two of the diodes 18, i.e., the diodes D1 and D2. Additionally, the resistor R1 is connected between diode D1 and the positive (first) input to the op amp 16, in series with the resistor R2. The resistors R4 and R5 are similarly connected to diode D3, referred to herein as the auxiliary diode D3 for clarity to represent its use in the auxiliary section 12B as opposed to the bandgap core 12A, and diodes D1 (with its resistor R1) and D2, as well as the positive (first) and negative (second) inputs to the op amp 16. Due to manufacturing process variation and other factors, the voltage reference ($V_{REF}$) on the reference voltage rail 111 at node N1 will tend to vary from that of other identically configured electrical circuits 10. This may be true even for bandgap cores 12A produced in the same batch. A trimming process is therefore performed via the trimming element 20 during production to account for such variation.

As described below, the trimming element 20 in its various constructions is coupled to a current source 19-, the auxiliary section 12B of the bandgap reference circuit 12, and the positive voltage rail 11$^+$. The auxiliary diode (D3) has an anode connected to the current source 19 and a cathode connected to the remaining cathodes of the diodes D1 and D2 and going to the negative voltage rail 11$^-$. The trimming element 20 as contemplated herein is situated external to the bandgap core 12A and has an adjustable set point. The bandgap core 12A is thus characterized by an absence of associated trimming switches. The adjustable setpoint in turn is operable to bias the auxiliary section 12B during a trimming process to thereby change the voltage reference ($V_{REF}$).

Trimming in accordance with the present disclosure occurs with the assistance of the current source 19 or an emulation thereof, which is connected to the bandgap core 12A and the positive voltage rail 11$^+$. The present approach allows trimming of the voltage reference ($V_{REF}$) without having to access the bandgap core 12A.

The trimming element 20, which is located external to the non-trimmable bandgap core 12A, has an adjustable set point operable to inject a bias current ($I_{c3}$) into the auxiliary section 12B and thereby trim the voltage reference ($V_{REF}$) during the present trimming process. As appreciated by those skilled in the art, 1-point trimming refers to a calibration technique for improving accuracy of the voltage reference ($V_{REF}$). This occurs by correcting process variations at a single temperature, typically at or near room temperature. Additional techniques may be implemented to compensate for base-emitter curvature, as described below with reference to FIGS. 3 and 4.

In a possible approach, the current source 19 exemplified in FIG. 1 may be implemented as a current mirror. The current mirror may be constructed by shorting or tying together respective gate terminals of a pair of transistors, e.g., field effect transistors (FETs) 22A and 22B with respective gate (G), source(S), and drain (D) terminals via an electrical conductor 25. For instance, the FETs 22A and 22B may be configured as first and second p-channel metal-oxide semiconductor (PMOS) elements connected at node N2. Either of the FETs 22A or 22B may act as the trimming element 20 herein, with the FET 22A of FIG. 1 thus being exemplary and non-limiting.

In the generalized embodiment of FIG. 1, the diodes D1 and D2 have different respective current densities. The current density of a given diode is given by its total diode current divided by its diode area. In a non-limiting example, the diode D2 may have a current density that is higher than, e.g., 800 percent of (8X), the current density of the diode D1 so as to generate a positive $dV_{BE}$ on resistor R1. Assuming that the diodes D1 and D2 carry the same current, the current density ratio is inversely proportional to the emitter area ratio. In this embodiment, diode D1 has a relative current density of 1X and a relative area of 8X, while diode D2 has a relative current density of 8X and a relative area of 1X. The auxiliary diode D3 may have the same area as diode D2. Therefore, there will be a higher current with some variable component due to trimming. Thus, the labels "1X" and "8X" are used in FIGS. 1 and 4 to indicate representative relative current densities to generate a first component of the PTAT voltage as detailed below.

In this particular example, the diodes D2 and D3 each have an equivalent smaller-area and higher current density, and thus will exhibit a higher base-emitter voltage ($V_{BE}$). In contrast, diode D1 would exhibit a much lower base-emitter voltage ($V_{BE}$). The exemplary ratio 8:1 would thus create a differential voltage ($dV_{BE}$) across resistor R1. The $dV_{BE}$ voltage is then amplified by a ratio R2/R1 to produce a non-trimmed component of the PTAT voltage. For trimming, another component of the PTAT voltage originates as another $dV_{BE}$ value between diodes D2 and D3. This voltage is imprinted on the resistors R4 and R5 and then translated to the complete PTAT voltage across the resistors R2 and R3. The complete PTAT voltage is ultimately used to generate the desired relatively time-invariant reference ($V_{REF}$) at node N1. In general, trimming is enabled via the trimming element 20 within the current source 19 in the embodiment of FIG. 1. The location of the trimming element 20 is entirely external to/outside of the bandgap core 12A as noted above. This location enables cost effective trimming without altering the bandgap core 12 in any way. It is also helpful that trimming does not impact the auxiliary section 12B, where the diodes D1, D2, and D3 and the resistors R1-R5 are densely packaged in close proximity to one another. This feature becomes more important with the added circuit complexity when implementing curvature compensation schemes.

In an optional configuration, the electrical circuit 10 of FIG. 1 may include a current digital-to-analog converter (DAC) 27 in lieu of the FET-integrated trimming element 20. As described below with reference to FIGS. 5B and 6, for instance, one may implement an approach similar to that of the method 200M to perform a trimming within the electrical circuit 10 of FIG. 1. In such a case, digital input signals (arrow CC) from an external processor (P) 50 may be communicated to the current DAC 27 to tune the resulting bias current Ic3. Without the current DAC 27, however, trimming may proceed in accordance with other suitable methods, e.g., the method 100M described herein with reference to FIG. 5A.

Figure 2:
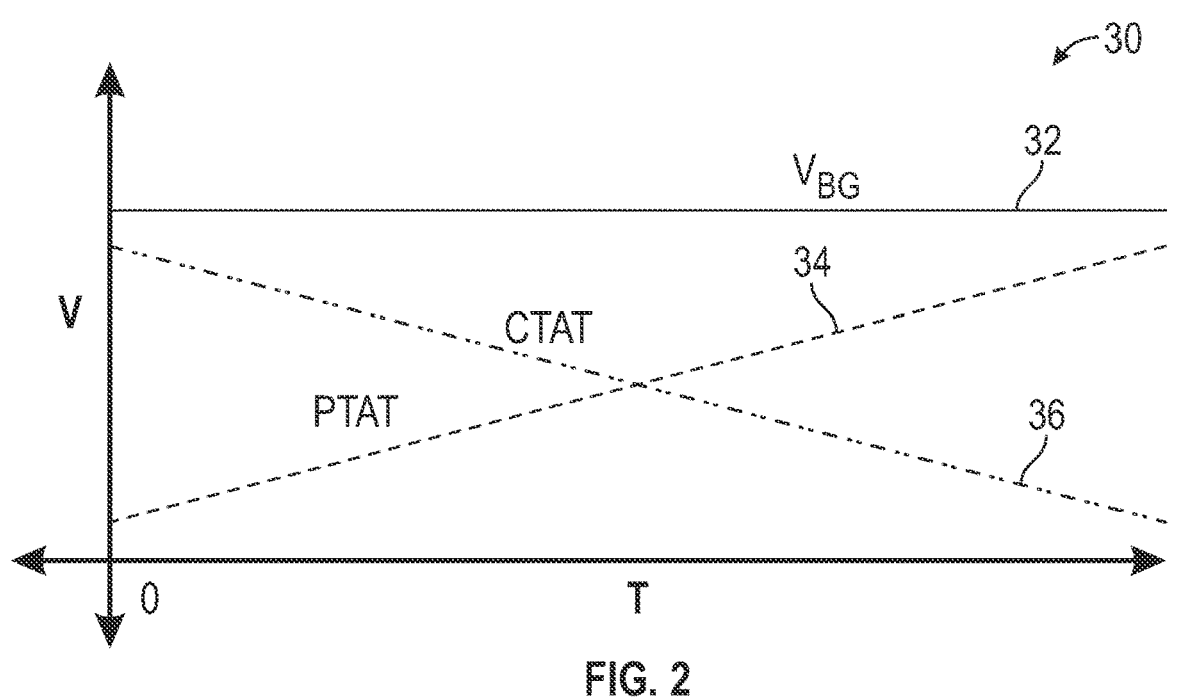
FIG. 2 is plot describing a generalized relationship between a proportional-to-absolute temperature voltage and a complementary-to-absolute temperature voltage, with voltage depicted on the vertical axis and temperature illustrated on the horizontal axis.

PTAT and CTAT: Referring briefly to the plot 30 of FIG. 2 which depicts a general relationship of voltage (V) on the vertical axis and temperature (T) on the horizontal axis, the bandgap voltage ($V_{BG}$) is represented by trace 32. The bandgap voltage ($V_{BG}$) is produced by summing the PTAT voltage (trace 34) produced by proper scaling of the delta in the base-to-emitter voltage ($dV_{BE}$) of a transistor, for instance a bipolar junction transistor (BJT), with the complementary-to-absolute temperature (CTAT) voltage (trace 36), i.e., the base-to-emitter voltage ($V_{BE}$). BJTs and associated bandgap core circuitry may be used to generate the PTAT and CTAT voltages. Such voltages respectively increase and decrease linearly with temperature.

Utilizing fundamental BJT equations reveals that the PTAT voltage in the bandgap core 12A of FIG. 1 having the resistors R1, R2, and R3 and diodes D1 and D2 depends solely on its resistor ratios:

$$PTAT = \left(\frac{R2}{R1}\right)V_t\ln\left(\frac{J_{c2}}{J_{c1}}\right)$$

where $V_t$ is the thermal voltage and Jc1 and Jc2 are corresponding current densities of diodes D1 and D2. This equation is valid only if R2=R3. However, similar equations may be derived for situations in which R2 and R3 are of different values, as appreciated in the art. The ratio of CTAT to PTAT may be selected such that the resulting bandgap voltage ($V_{BG}$) is substantially temperature invariant as shown in generalized plot 30 of FIG. 2, i.e., is constant or flat over the expected operating temperature range. This represents an ideal case having no curvature.

Referring again to FIG. 1, a generalized implementation is illustrated via electrical circuit 10. Biasing of the auxiliary diode D3 via bias current Ic3 may be trimmed during manufacturing via the trimming element 20 in such a way as to generate a voltage drop across the resistors R4 and R5, through which an auxiliary input is provided to the bandgap core 12A. Doing this has the beneficial effect of injecting the trimmed bias current Ic3 into the auxiliary section 12B of the bandgap circuit 12. Because the diode D3 is biased with bias current Ic3, the voltage drop across resistors R4 and R5 is effectively proportional to a set point of the trimming element 20. As the set point of the trimming element 20 directly controls $dV_{BE}$ on resistors R4 and R5, this to some extent also controls the component of the PTAT voltage represented by trace 32 of FIG. 2. The PTAT voltage is based on the magnitude of the trimmed bias current Ic3 produced by control of the trimming element 20 during trimming, and therefore the present approach is a form of PTAT-based trimming strategy.

Figure 4:
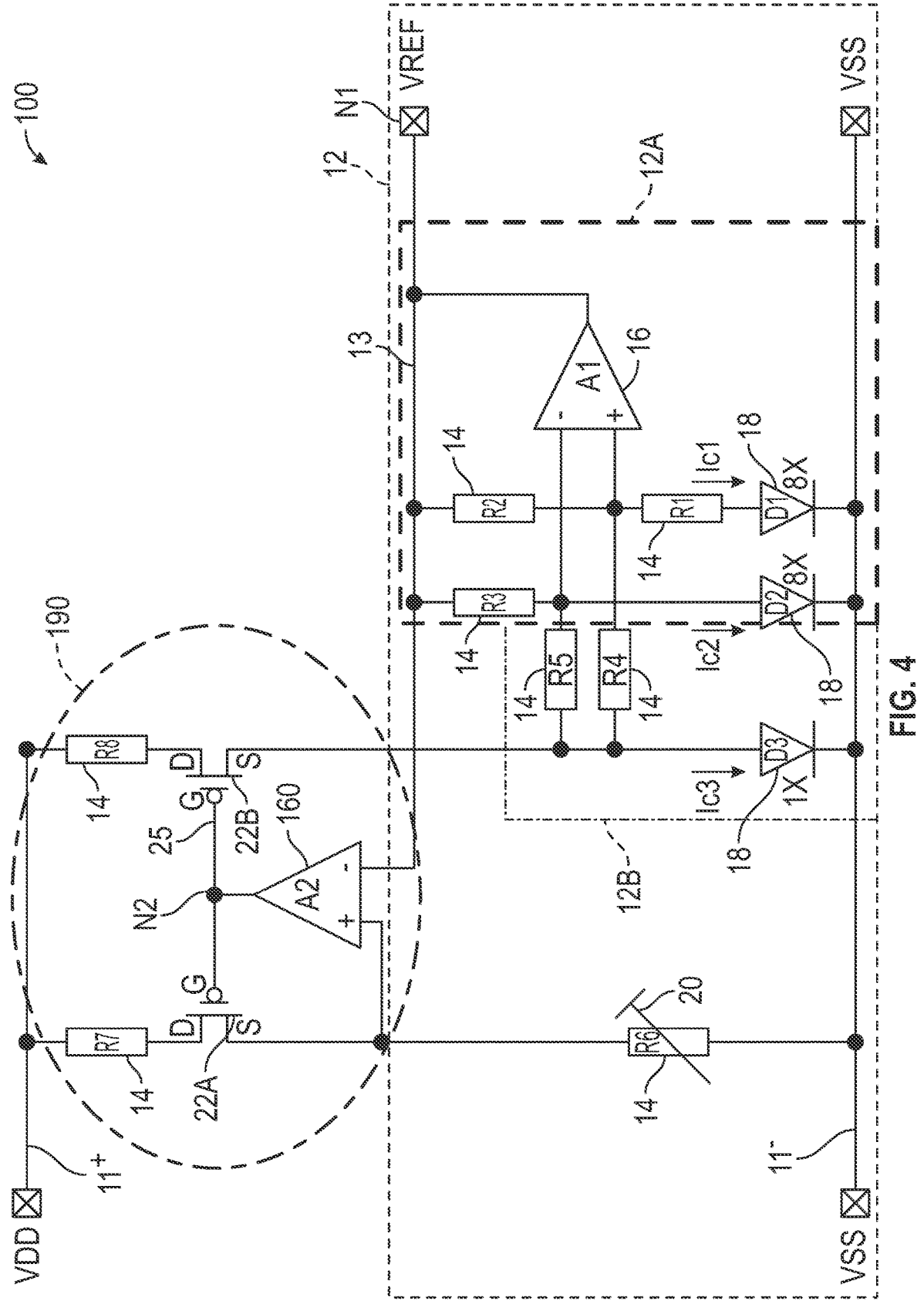
FIG. 4 is another representative electrical circuit with curvature compensation in accordance with one or more alternative embodiments.

Current Mirror Ratio: As appreciated by those skilled in the art, current mirrors are frequently used in analog ICs to replicate a given current in different circuit branches. When the current source 19 of FIG. 1 or 190 of FIG. 4 is constructed as a current mirror as shown, one may change the mirror ratio to provide an output current larger than the particular reference current from the bandgap core 12A. That is, the bias current Ic3 may be trimmed by changing the mirror ratio of the current source 190. By way of example and not limitation, voltage-controlled MOSFETs, transconductance amplification MOSFETs, or MOSFETs having body biasing may be used in one or more implementations to implement the trimming element 20 of FIG. 1.

Using a theorem of superposition, equations can be derived for the bandgap voltage ($V_{BG}$) (see FIG. 2) that include an additional variable: the above-noted mirror ratio. Assuming that R2=R3 and that R4=R5 in the representative bandgap core 12A of FIG. 1, with its representative and non-limiting 8X and 1X (relative area) core diodes D1 and D2 (and with D2 and D3 having the same area):

$$V_{BG} \sim V_{BE} + \left(\frac{R2}{R1}\right) V_T \ln\left(\frac{8}{1}\right) + \left(\frac{R2}{R4}\right) V_T \ln\left(\frac{1}{2 * \text{MIRROR RATIO}}\right)$$

Those skilled in the art will appreciate that MIRROR RATIO works as a mechanism that can adjust PTAT component of generated bandgap voltage ($V_{BG}$). A similar approach may be used when the auxiliary circuit is linked to a curvature compensation circuit.

Figure 3:
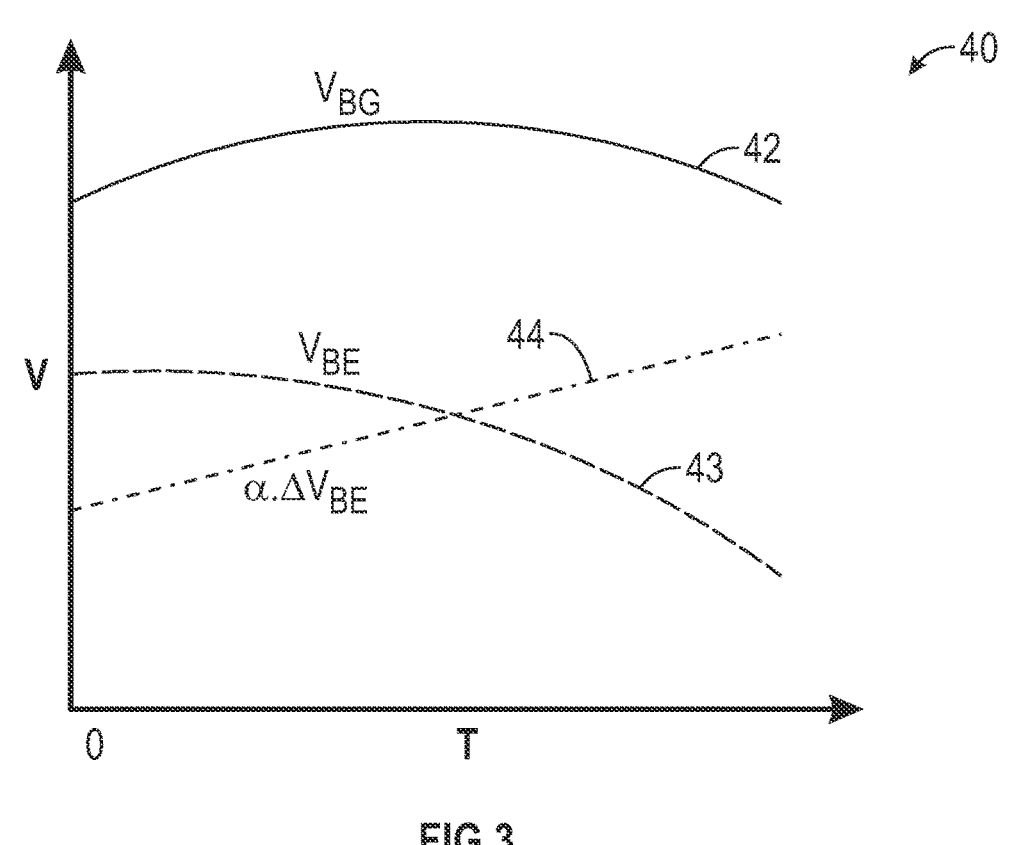
FIG. 3 is a plot of a parabolic bandgap voltage over a representative temperature range, with voltage depicted on the vertical axis and temperature illustrated on the horizontal axis.

Curvature Compensation: Referring briefly to FIG. 3 and its plot 40 of voltage (V) and temperature (T), the base-to-emitter voltage ($V_{BE}$) (trace 43), i.e., the CTAT voltage, may exhibit residual nonlinearities with respect to temperature. The PTAT voltage of trace 44 varies linearly as shown, similar to the generalized characteristics of FIG. 2. Here, trace 44 is represented as $\alpha * dV_{BE}$, where $\alpha = R2/R1$. For its part, $dV_{BE}$ may be expressed as:

$$dV_{BE} = V_t * \ln\left(\frac{Jc2}{Jc1}\right) = V_t * \ln\left(\frac{Ic2}{Ic1}\right) * (A1/A2)$$

where Ic is the current in the collector of the indicated diode D2 or D1, and A is the emitter area of the same diode D2 or D1.

Trace 42 corresponds to the bandgap voltage ($V_{BG}$), i.e., the sum of traces 43 and 44. That is, the natural $V_{BE}$ vs. temperature curve of a BJT operated at constant current is slightly quadratic or parabolic in shape, as indicated by the parabolic trajectory of trace 42. Curvature compensation schemes are often used to correct for this curvature. One such scheme is referred to in the art as the Malcovati curvature compensation strategy as illustrated in the alternative electrical circuit 100 of FIG. 4, and uses a resistor ratio to set an appropriate amount of compensation. Some implementations seek to improve performance by fixing this ratio over temperature. CTAT voltage is generated by absolute BJT voltage, i.e., $V_{BE}$, which in turn can depend on saturation current and bias current. As a result, the reference voltage ($V_{REF}$) at node N1 may exhibit process-related variation.

Referring now to the electrical circuit 100 of FIG. 4, the electrical circuit 100 may be configured to provide the aforementioned curvature compensation when correcting nonlinearities in the base-emitter voltage ($V_{BE}$) as illustrated in FIG. 3. Those skilled in the art will recognize that the auxiliary section 12B of the proposed bandgap circuit 12 is used in Malcovati curvature compensation. Additional resistors 14 labeled R7 and R8 may be used within the current source 190 in such a topology.

Setting of the ratio of resistors R2 (R2=R3) and R4 (R4=R5) effectively cancels the natural $V_{BE}$ curvature of trace 42 (FIG. 3) using the FETs 22A, 22B and the additional op amp 160 to counter the curvature, thus enhancing temperature stability. Thus, when applying curvature compensation in FIG. 4, the op amp 160 includes an output at node N2 that is connected to respective gate terminals (G) of the pair of FETs 22A, 22B, a first input (−) connected to the reference voltage node N1, and a second input (+) connected to the trimming element 20.

The trimming element 20, in this particular instance including the trimming resistor R6 having an adjustable setpoint, is directly connected or referenced to the negative voltage rail 11⁻, i.e., electrical ground, with trimming made possible via adjustment to the trimming resistor R6. As with FIG. 1, trimming is performed in the electrical circuit 100 of FIG. 4 exclusively outside of the bandgap core 12A, thus avoiding the residual error accumulation commonly associated with adjustment of resistor ratios in the bandgap core 12A.

As will be appreciated by those skilled in the art in view of the foregoing disclosure, the electrical circuits 10 and 100 of respective FIGS. 1 and 4 lend themselves to a method of trimming the voltage reference ($V_{REF}$) in the electrical circuit 10, 100 having the bandgap circuit 12. In general, such a method would be performed during manufacturing via automated test equipment (not shown).

In a possible closed-loop implementation, a volt meter may be connected to node N1. The method may include measuring an output voltage of the electrical circuit 10, 100 as a temperature invariant reference voltage ($V_{REF}$). Concurrently, the voltage reference ($V_{REF}$) may be compared to a predetermined value, for instance 1.25V. Additionally, the method may include adjusting the set point of the trimming element 20 of the electrical circuit 10 of FIG. 1 or the electrical circuit 100 of FIG. 4, with the trimming element 20 in either instance being located external to the bandgap core 12A.

Figure 5A:
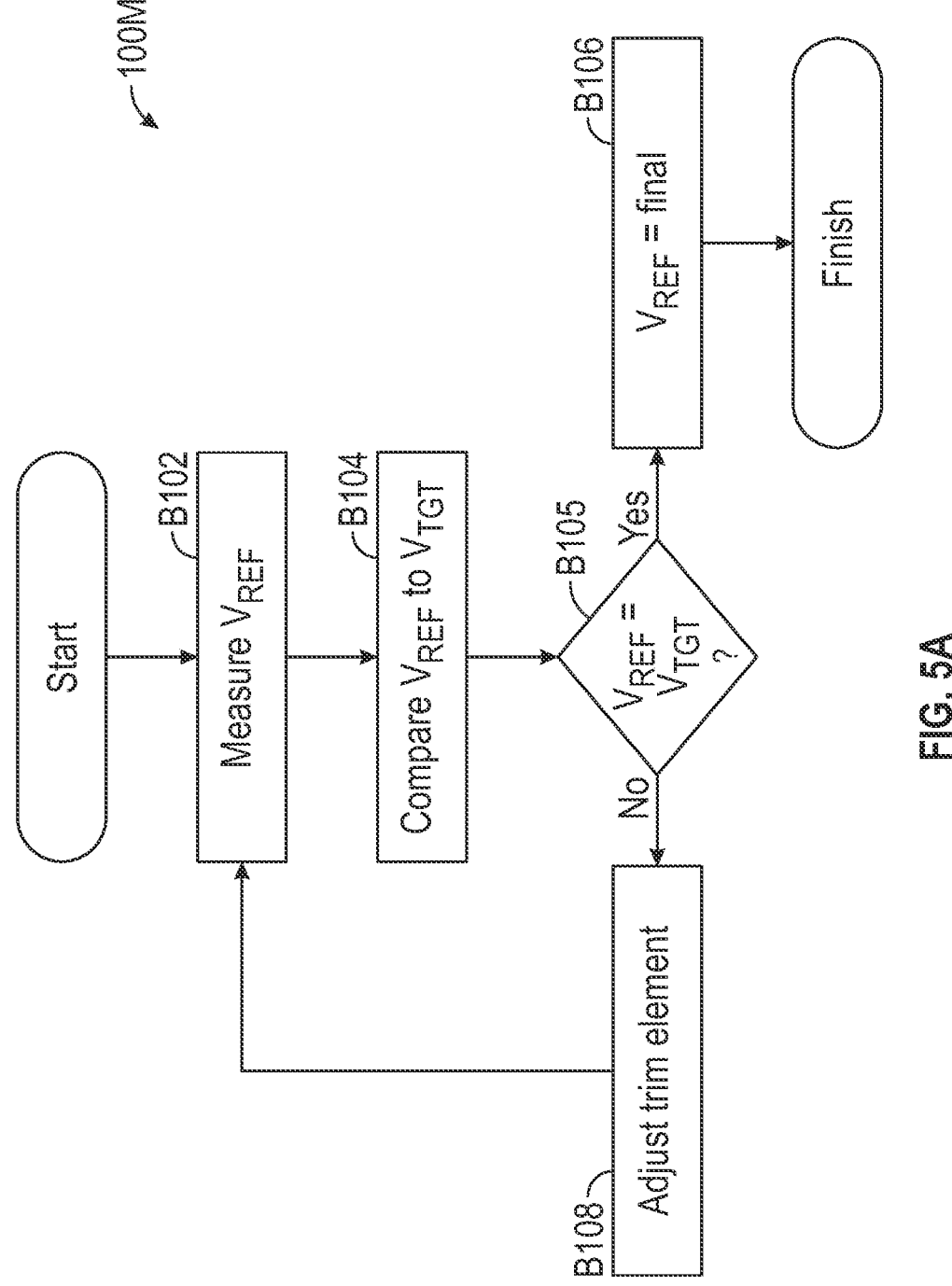
FIGS. 5A and 5B are flow charts describing exemplary trimming methods for use with the circuits of FIGS. 1 and 4.

Referring briefly to FIG. 5A, a method 100M for trimming a voltage reference ($V_{REF}$) in an electrical circuit 10 or 100 having the bandgap reference circuit 12 may be performed during manufacturing. The method 100M may be performed via linear sweep starting at the low end of a defined sweep range in some embodiment. If a relationship between a trimming code and a resultant voltage reference ($V_{REF}$) is unknown, or if the relationship is unstable, i.e., is not the same for every manufactured instance, then it may be necessary to perform a sweep of every trim code. Although this process can be relatively time consuming, the method 100M may be used in certain applications where trimming time is not of the essence.

In an exemplary implementation, such a method 100M may commence and proceed to method step/block B102 ("Measure $V_{REF}$") with measuring of an output voltage of the bandgap reference circuit 12 as the voltage reference ($V_{REF}$). The method 100M then proceeds to block B104.

At block B104 ("Compare $V_{REF}$ to $V_{TGT}$"), the method 100M may include comparing the measured voltage reference ($V_{REF}$) from block B102 to a predetermined or calibrated target value ($V_{TGT}$), e.g., using comparator logic of an associated computer device (not shown). The method 100M then proceeds to block B105.

Block B105 ("$V_{REF}=V_{TGT}$?") may include determining whether the measured voltage reference ($V_{REF}$) exceeds the target value ($V_{TGT}$) of block B104. The method 100M proceeds to block B106 when $V_{REF}>V_{TGT}$, and to block B108 in the alternative.

Block B106 ("$V_{REF}=$Final") includes setting the voltage reference ($V_{REF}$) of block B102 to a final value, i.e., $V_{REF}=$Final, when the voltage reference ($V_{REF}$) equals a predetermined value. Block B106 then includes discontinuing adjusting the set point. The method 100M is complete ("FINISH") once the final value has been achieved, recorded in non-volatile memory, and read back to thereby set the parameters of the adjustable element 20.

Block B108 ("Adjust Trim Element") includes adjusting the set point of the trimming element 20 located external to the bandgap core 12A. This may be accomplished in a variety of ways, including using a successive approximation reduction (SAR) algorithm, a linear increment method, or multi-slope approaches, all of which are appreciated in the art. Importantly, set point adjustment occurs without modifying a parameter of the bandgap core 12A, such that a bias current Ic3 is injected into the auxiliary section 12B to change the reference voltage ($V_{REF}$).

Figure 5B:
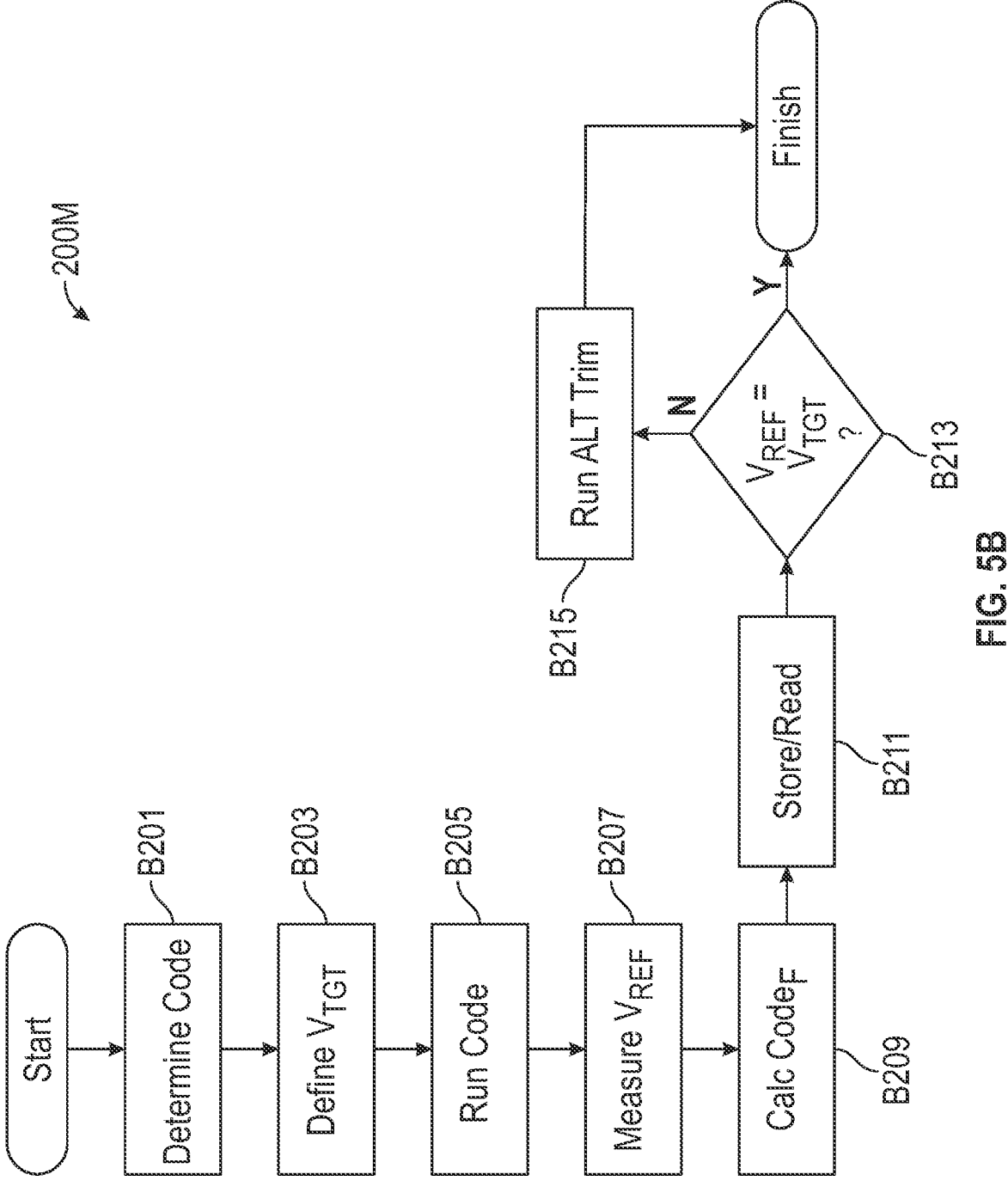

Another method 200M as illustrated in FIG. 5B may be used to find an objectively "best" code for the setting the voltage reference ($V_{REF}$), with "best" as used herein meaning the particular trimming code that produces a $V_{REF}$ value closest to the desired target ($V_{TGT}$). Relative to performing the iterative approach of FIG. 5A, searches may be performed via method 200M in a predictive manner from as few as one iteration (e.g., from one measurement) to predict the final best code to use. The trimming approach of FIG. 5B may be desirable to help minimize and standardize test time.

To use such an approach, it is first necessary to have a well-defined and stable relationship between the trimming code and the resulting $V_{REF}$ value. In other words, a transfer function defining the resulting trimming behavior for a given code must be predictable, i.e., every die configured with the trimming element 20 should behave in the same way in response to the same trim code. To measure randomness, one can utilize any relevant metric, such as but not limited to integrated nonlinearity (INL) and differential nonlinearity (DNL). As appreciated by those skilled in the art, voltage reference ($V_{REF}$) is typically a nonlinear function of the trimming code that is proportional through a log function, an exponential function, or a linear function in different embodiments.

Figure 6:
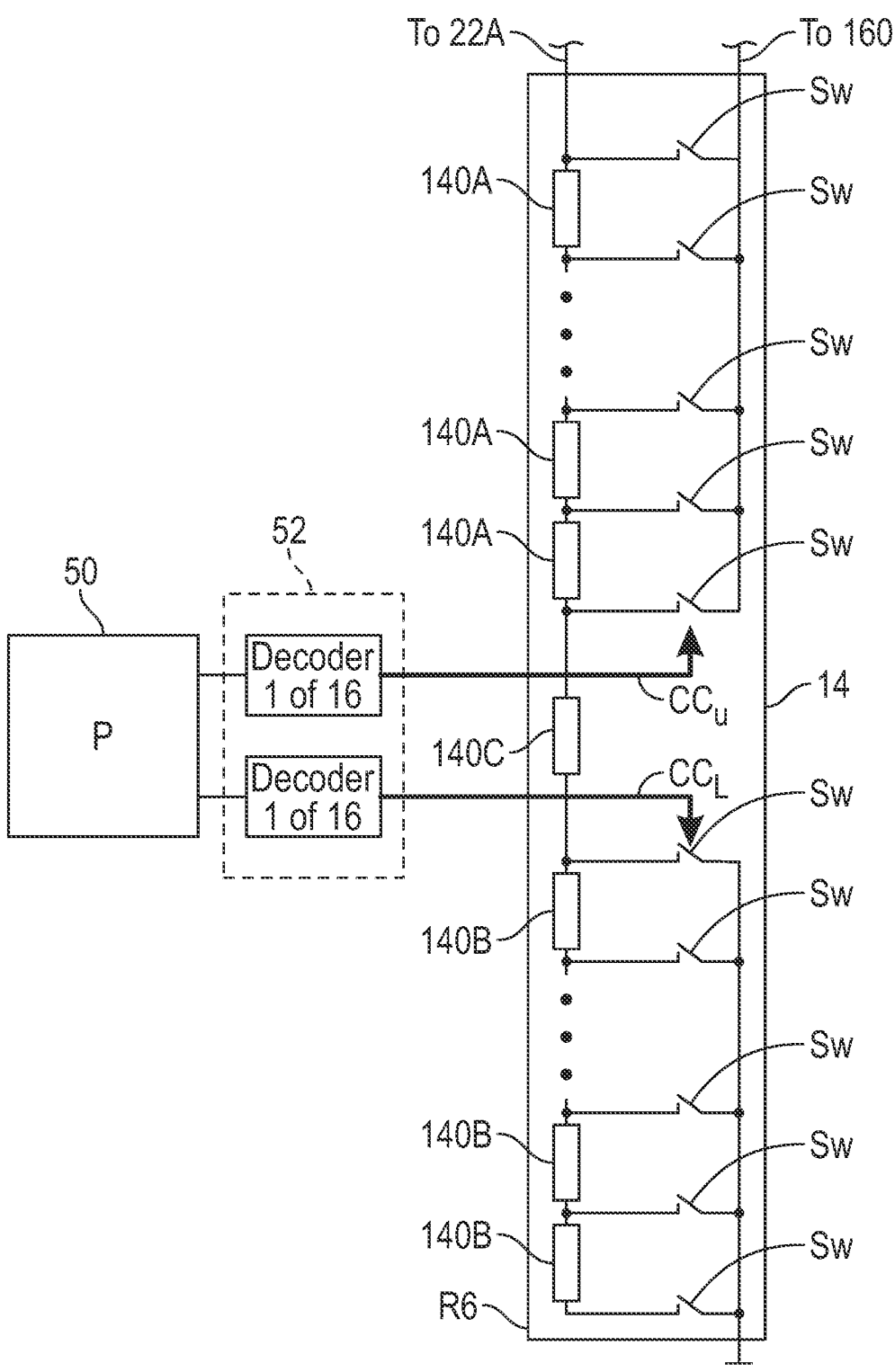
FIG. 6 is a schematic illustration of a possible construction of a trimming resistor construction for the electrical circuit of FIG. 4.

Referring briefly to FIG. 6, the resistor 14 of FIG. 4 configured as the trimming resistor R6 is shown in greater detail for illustrative clarity. The trimming resistor R6 is connected to the FET 22A and the op amp 160 of FIG. 4, as indicated, with such structure omitted from FIG. 6 for illustrative simplicity.

During trimming, the resistance value of the trimming resistor R6 may be modified via individual control of switches ($S_W$) to connect or disconnect corresponding resistors 140A, 140B, or 140C. Once again, this occurs without modifying the non-trimmable bandgap core 12A. In a possible implementation, the resistors 140A, 140B, and 140C have different values, for instance with the resistors 140C being nominal unit resistors and the resistors 140A having a resistance value of $\frac{1}{16}^{th}$ that of the resistors 140C. The illustrated middle resistor 140C, which is shown as a single element for illustrative simplicity, may be configured as forty-eight (48) series-connected resistors in a possible embodiment. This requires a stable transfer function as noted above, which will be limited by matching properties of internal resistors 140A, 140B, or 140C used to construct the trimming resistor R6. Thermometric implementation allows for optimal INL/DNL results and benefits from the illustrated ground connection. That is, switches ($S_W$) that are referenced to ground have a maximum gate-to-source voltage allowing for optimal resistance between the drain and source resistance, i.e., Rds (on).

In this particular scheme, the 8-bit trimming range may be implemented as a segmented DAC, which provides a combination of thermobaric range and binary weight range for optimal INL/DNL. In this case, the thermometric code is implemented on both ranges for simplicity. An 8-bit code may be split into 2×4 bits decoded to sixteen levels, i.e., 16×16=256 combinations for a full 8-bit bus. Such an arrangement would correspond to a trimming resistor R6 having thirty-two (32) resident switches (Sw). The thermometric nature of the design helps to ensure monotonicity and leads to good INL/DNL, and thus to good behavior predictability.

The method 200M of FIG. 5B may be implemented for faster trimming using the example trimming resistor R6 of FIG. 6, possibly using predictive trimming with one or two measurements of the voltage reference ($V_{REF}$).

In a representative embodiment, the method 200M of FIG. 5B may commence with block B201 ("Determine Code") with predefining a "best" initial code and a code step. For example, one code step may be set equal 0.001V, and the 8-bit code would make a total of 256 available codes (from code 0 to code 255). Block B201 may entail determining or defining the particular initial code to use, which may be a most likely code to cause the voltage reference ($V_{REF}$) to match a desired target value ($V_{TGT}$), e.g., the most probable based on historical data from similarly configured circuits. In other words, block B201 may entail determining a "best guess" at the correct code to use on trimming resistor R6 to produce the target value ($V_{TGT}$). The method 200M then proceeds to block B203.

Block B203 ("Define $V_{TGT}$") includes defining the above-noted target voltage reference, for instance 1.2V in a non-limiting exemplary embodiment. This will likely be the same value used to determine the initial code in block B201. Thus, blocks B201 and B203 may be performed simultaneously, or with block B203 preceding block B201 in different implementations. The method 200M then proceeds to block B205.

At block B205 ("Run Code"), the initial best code from block B201 is read from non-volatile memory. In the trimming resistor R6 of FIG. 6, this entails communicating control signals ($CC_U$, $CC_L$) to the switches (Sw) as shown to translate the individual switches to a particular corresponding state. Using the segmented DAC 52, this action would entail transmitting four bits to the sixteen upper switches (Sw), i.e., those corresponding to the resistors 140A at the upper half of the resistor R6 of FIG. 6, and four bits to the sixteen lower switches (Sw), with "lower" in this case corresponding to resistors 140B and meaning "referenced to ground", which can also be see in FIG. 4. That is, the trimming resistor R6 of FIG. 6 includes first and second groups of internal resistors and switches, with the segmented DAC 52 operable for controlling corresponding switching states of the switches (Sw) of the first and second groups to connect or disconnect the internal resistors 140A, 140B, and/or 140C. The method 200M then proceeds to block B207.

Block B207 ("Measure $V_{REF}$") includes measuring the voltage reference ($V_{REF}$), e.g., via a meter or other suitable technique. The method 200M then proceeds to block B209.

At block B209 ("Calc $Code_F$"), the method 200M includes determining the final best final code for trimming. In keeping with the foregoing example discussion:

$$\text{CODE ADJUSTMENT} = \frac{(V_{TGT} - V_{REF})}{\text{Code Step}}$$

where $V_{REF}$ is the measured voltage reference from block B207 and "CODE ADJUSTMENT" is the amount of change needed to transition from the current code (initial code as set forth above) to the best final code. Using example values of $V_{TGT}$=1.2V and $V_{REF}$=1.1V, with a pre-defined code step of 0.001V, then "BEST CODE" in this example is calculated as (1.2V-1.1V)/0.001V=100. That is, trimming code=100 would be the amount of change needed to adjust from the current code to the best code, and to thus adjust the voltage reference ($V_{REF}$) from 1.1V to 1.2V. The method 200M then proceeds to block B211 once the best final code has been determined.

Block B211 ("Store/Read") entails storing the code from block B209 in nonvolatile memory and then reading the code during a final validation step. The method 200M then proceeds to block B213.

Block B213 ("$V_{REF}$=$V_{TGT}$") includes measuring the voltage reference ($V_{REF}$) and comparing the same to the above-noted target value ($V_{TGT}$). While unlikely, the possibility remains that one or more of the resistors 140A, 140B, and/or 140C of the trimming resistor R6 could be broken during manufacturing or defective, such that the target value ($V_{TGT}$) cannot be reached with the best final code. In such as case, the voltage reference ($V_{REF}$) will not match the target value ($V_{TGT}$). When this occurs, the method 200M proceeds to block B215. Otherwise, the method 200M is finished.

At block B215 ("Run Alt Trim"), the method 200M may include using an alternative trimming method, e.g., the method 100M of FIG. 5A. The method 200M is finished once trimming is successfully completed.

For higher accuracy, it may be desirable to use 8 or 9 bits for trimming. In order to achieve good predictability, it may be necessary to use some form of thermometric codes. That is, each bit of the thermometric code controls whether a corresponding identical unit component is switched on or off. For example, the four bits to the lower switches (Sw) could be binary weighted and the remaining four or five bits to the upper switches (Sw) could be thermometric in one or more embodiments. In that instance, sixteen or thirty-two wires/switches and individual resistors 140 may be used. Since the trimming resistor R6 must be cut into these constituent pieces, such a construction would be a challenge to implement within the hardware of the bandgap core 12A. The present approach in contrast performs trimming entirely outside of the bandgap core 12A.

Thus, the methods 100M and 200M enable trimming via the auxiliary section 12B of FIGS. 1 and 4 by measuring an output voltage of the non-trimmable bandgap core 12A as the voltage reference ($V_{REF}$) in response to reading the initial trimming code from non-volatile memory, comparing the voltage reference ($V_{REF}$) to a calibrated target value to determine a voltage difference, and calculating the final trimming code using the voltage difference. Both methods 100M and 200M proceed by adjusting a set point of a trimming element 20 of the electrical circuit 10 or 100 of FIG. 1 or 4, respectively, via the final trimming code. This occurs without modifying a parameter of the non-trimmable bandgap core 12A, with the trimming element 20 being arranged in the auxiliary section 12B of the electrical circuit 10, 100 external to the non-trimmable bandgap core 12A. Trimming also occurs such that the bias current Ic3 is injected into the auxiliary section 12B to change the voltage reference ($V_{REF}$) to the target value.

Figure 7:
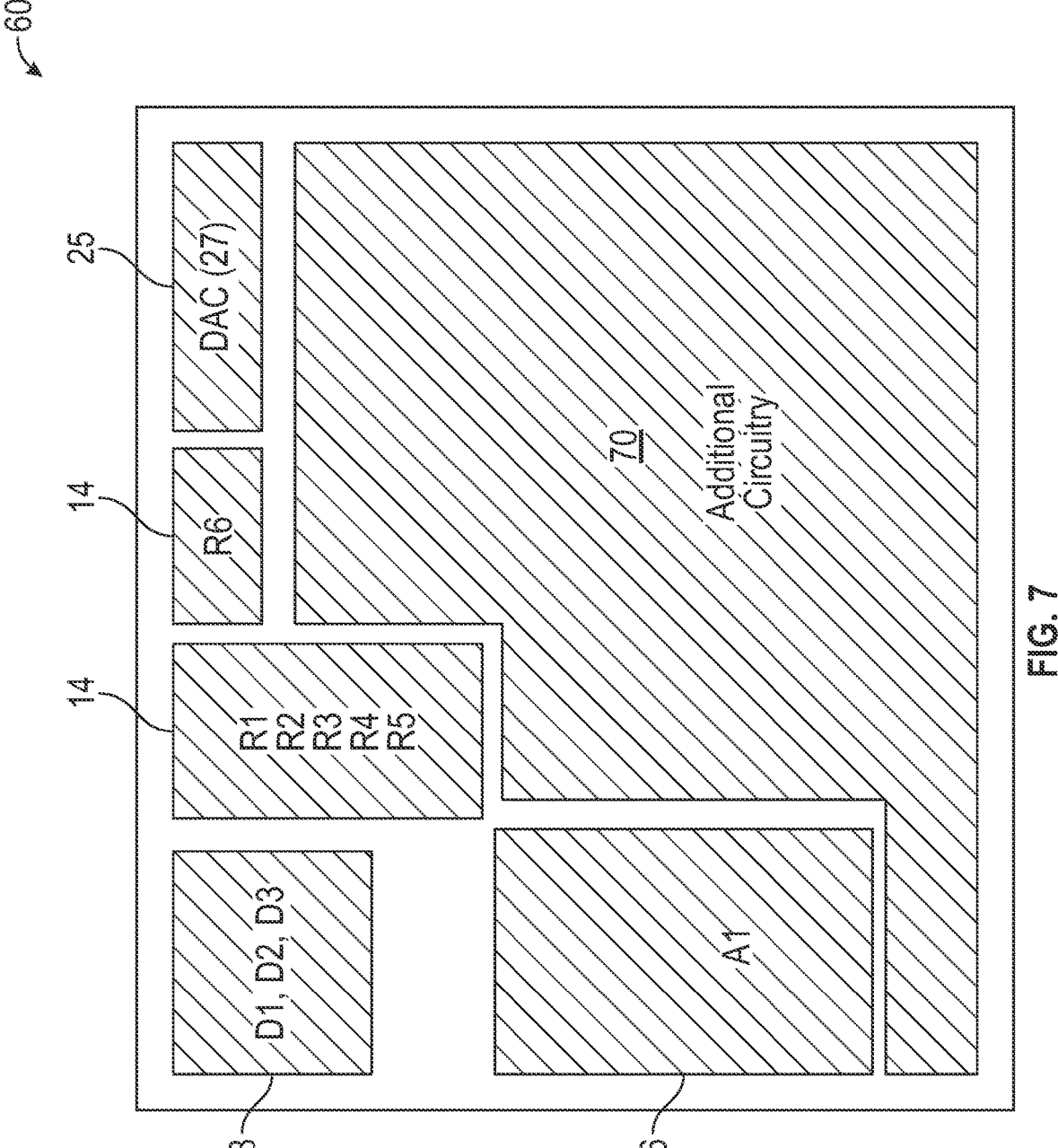
FIG. 7 illustrates a representative layout for implementing the electrical circuits of FIG. 1 or 4 in accordance with aspects of the disclosure.

Turning now to FIG. 7, the use of the non-trimmable bandgap core 12A described allows foregoes the required packaging space and complexity required for implementing trimming switch hardware. The layout 60 of FIG. 7 provides an example of relative spacing in a highly simplified schematic illustration. In a typical semiconductor die, the total surface area may be allocated to a variety of electrical components and circuits. For instance, the op amp 16 (A1) of FIG. 4 may take up substantial area, as would any additional circuitry 70 possibly unrelated to provision of the voltage reference ($V_{REF}$).

The electrical circuit 100 of FIG. 4, for instance, may package the diodes 18 (D1, D2, D3) very densely in close proximity to the resistors 14 (R1, R2, R3, R4, R5). The individual diodes 18 and resistors 14 are compactly packaged. The bandgap core 12A of FIG. 4 is thus highly complex with very limited packaging space. While compact packaging is less sensitive to temperature, process variations, and stress, it is desirable not to inject noise into the diodes 18, e.g., from switching associated with trimming. Thus, the trimming resistor R6 may be packaged apart from the bandgap core 12A as described above and shown in FIG. 7, e.g., adjacent to the resistors 14 but in a separate area of the die. The optional current DAC 27 of FIG. 1 may also be packaged apart from components of the bandgap core 12A, with the particular layout varying with the intended application of the manufactured chip.

Among other attendant benefits of the foregoing disclosure, the circuit topologies and associated trimming strategies of FIGS. 1 and 4 can be used for high-accuracy references with good area/consumption/accuracy results. The proposed solutions do not require changes to resistor ratios within the non-trimmable bandgap core 12A, nor do the proposed solutions contain switches that could possibly interfere with the sensitive bandgap core 12A and its operations. Instead, PTAT voltage is implemented via the trimming element 20, referenced to ground, which greatly helps with practical implementation as trimming often requires 8-bit accuracy (256 values) or greater accuracy. Thus the purposeful tuning of the voltage drop ($dV_{BE}$) injected to the resistors R4 and R5, i.e., the inputs to the op amp 16, is used to change the voltage reference ($V_{REF}$) and set it to a desired value during the calibration process. The trimming element 20 is positioned on a different area of the chip than is occupied by the non-trimmable bandgap core 12A. Being non-trimmable, the bandgap core 12A foregoes the required packaging space and complexity required for implementing trimming switch hardware.

In essence, the approach set forth in detail above is characterized by a PTAT voltage having two $dV_{BE}$ components: (i) a $dV_{BE}$ component from the normal operation of the bandgap core 12A, and (ii) a $dV_{BE}$ component from the auxiliary section 12B by tuning the current source 19 or 190 via the trimming element 20. The bandgap core 12A provides a larger PTAT voltage contribution, for instance about 80-90% of the total PTAT voltage, while the auxiliary section 12B would contribute the remaining 10-20%.

The concepts presented herein are compatible with curvature compensation schemes needed for achieving high accuracy, such as but not limited to the Malcovati compensation setup of FIG. 4, and may be implemented in line with wafer sort trimming to help reduce test costs. Another practical benefit of the foregoing disclosure is that it can easily utilize effective 1-point trimming schemes via the use of, e.g., thermometric codes. This is due to the fact that trimming may be achieved on an element referenced to the ground or power rail as noted above. These and other benefits of the present disclosure will be appreciated by those of ordinary skill in the art now having the benefit of the present teachings.

While several modes for carrying out the many aspects of the present teachings have been described in detail, those familiar with the art to which these teachings relate will recognize various alternative aspects for practicing the present teachings that are within the scope of the appended claims. The above description and accompanying drawings are illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An electrical circuit comprising:
a non-trimmable bandgap core configured to output a voltage reference, wherein the non-trimmable bandgap core is characterized by fixed resistor ratios and an absence of associated trimming switches;
a current source coupled to the non-trimmable bandgap core; and
an auxiliary section positioned external to the non-trimmable bandgap core, the auxiliary section including:
an auxiliary diode coupled to the current source;
a pair of resistors coupled to the bandgap core; and
a trimming element coupled to the current source external to the non-trimmable bandgap core, the trimming element having an adjustable set point operable to inject a bias current into the auxiliary section to thereby change the voltage reference during a voltage reference trimming process.

2. The electrical circuit of claim 1, wherein the trimming element is operable to output a proportional-to-absolute-temperature voltage component to the pair of resistors to change the voltage reference during the voltage reference trimming process.

3. The electrical circuit of claim 2, wherein the non-trimmable bandgap core includes a first diode and a second diode, and wherein an emitter area of the first diode is about eight times an emitter area of the second diode.

4. The electrical circuit of claim 1, wherein the current source includes a current mirror, and wherein the bias current is adjusted by changing a mirror ratio of the current mirror.

5. The electrical circuit of claim 4, wherein the current mirror is constructed of a pair of field effect transistors (FETs).

6. The electrical circuit of claim 5, wherein the pair of FETs includes a first p-channel metal-oxide-semiconductor (PMOS) and a second PMOS.

7. The electrical circuit of claim 6, wherein the trimming element is integral with the first PMOS or the second PMOS.

8. The electrical circuit of claim 7, further comprising:
a base-emitter voltage curvature compensation circuit.

9. The electrical circuit of claim 8, wherein the base-emitter voltage curvature compensation circuit includes an operational amplifier (op amp), the op amp including:
an output that is connected to respective gate terminals of the pair of FETs;
a first input connected to a reference voltage rail; and
a second input connected to the trimming element.

10. The electrical circuit of claim 1, wherein the trimming element includes a trimming resistor.

11. The electrical circuit of claim 10, wherein the trimming resistor includes first and second groups of internal resistors and switches, further comprising:
a segmented digital-to-analog converter (DAC) operable for controlling corresponding switching states of the switches of the first and second groups to thereby connect or disconnect the internal resistors.

12. The electrical circuit of claim 11, wherein the first and second groups of internal resistors and switches includes thirty-two of the internal resistors and thirty-two of the switches.

13. An electrical circuit comprising:
a positive voltage rail;
a negative voltage rail;
a reference voltage rail;
a non-trimmable bandgap core coupled to the reference voltage rail and the negative voltage rail;
a base-emitter voltage curvature compensation circuit connected to the positive voltage rail and the negative voltage rail, the base-emitter curvature compensation circuit including a current mirror;
an auxiliary diode connected to the current mirror and the negative voltage rail; and
a trimming resistor coupled to the current mirror external to the bandgap core, the trimming resistor having an adjustable set point, wherein the trimming resistor is configured such that an adjustment of the adjustable set point changes a mirror ratio of the current mirror and thereby injects a bias current into the auxiliary diode during a voltage reference trimming process, thereby changing a voltage reference on the reference voltage rail.

14. The electrical circuit of claim 13, wherein the non-trimmable bandgap core includes an operational amplifier having first and second input terminals connected to corresponding resistors, and wherein the trimming resistor is operable to output a proportional-to-absolute-temperature voltage component to the corresponding resistors to change the voltage reference during the trimming process.

15. The electrical circuit of claim 13, wherein the current mirror includes a pair of field effect transistors (FETs).

16. The electrical circuit of claim 15, wherein the pair of FETs includes a field first p-channel metal-oxide-semiconductor (PMOS) and a second PMOS.

17. The electrical circuit of claim 13, wherein the non-trimmable bandgap core includes a first diode and a second diode having different respective emitter areas, and wherein the auxiliary diode has a current density that is equal to a higher of the different respective emitter areas.

18. A method for trimming a voltage reference in an electrical circuit having a non-trimmable bandgap core, wherein the non-trimmable bandgap core is characterized by fixed resistor ratios and an absence of associated trimming switches, the method comprising:
measuring an output voltage of the non-trimmable bandgap core as the voltage reference in response to reading an initial trimming code from a non-volatile memory;
comparing the voltage reference to a calibrated value to determine a voltage difference;
calculating a final trimming code using the voltage difference; and
adjusting a set point of a trimming element of the electrical circuit via the final trimming code without modifying the non-trimmable bandgap core, the trimming element being arranged in an auxiliary section of the electrical circuit external to the non-trimmable bandgap core, such that a bias current is injected into the auxiliary section to change the voltage reference to a target value.

19. The method of claim 18, wherein the trimming element includes a trimming resistor that is directly referenced to a negative voltage rail or electrical ground of the electrical circuit, and wherein adjusting the set point of the trimming element includes adjusting a set point of the trimming resistor.

20. The method of claim 19, wherein the adjusting the set point of the trimming element includes adjusting a set point of a field effect transistor of a current source.

\*  \*  \*  \*  \*